United States Patent Office 3,387,256
Patented June 4, 1968

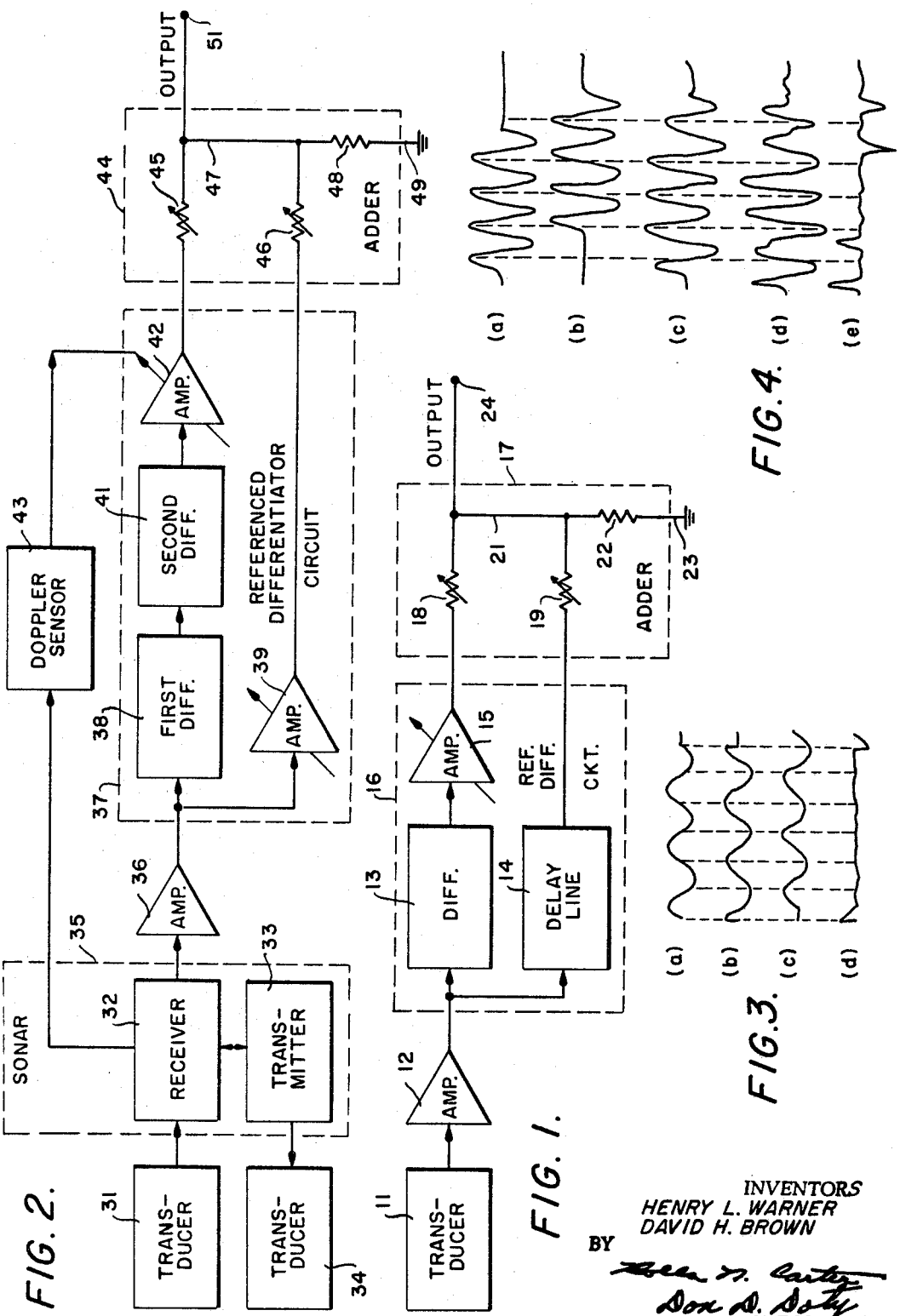

3,387,256
DATA SIGNAL PROCESSOR
Henry L. Warner and David H. Brown, Panama City,
Fla., assignors to the United States of America as represented by the Secretary of the Navy
Filed Feb. 21, 1966, Ser. No. 531,013
5 Claims. (Cl. 340—3)

ABSTRACT OF THE DISCLOSURE

A data signal processor for resolving a composite of integrated multiple signals into the component signals thereof having a receiving transducer, a referenced differentiator circuit for converting the composite signal received by said transducer into a plurality of signals having predetermined relative phase relationships, and an adder for producing an output signal that is the sum of the aforesaid plurality of predetermined phase-related signals.

---

The invention described herein may be manufactured and used by or for the Government of the United States of America for governmental purposes without the payment of any royalties thereon or therefor.

The present invention relates generally to data signal processors and in particular is an improved method and means for resolving a composite signal containing integrated multiple signals into their respective individual component signals. In even greater particularity, this invention is a sonar system attachment for restoring target echo signals that have been integrated by a receiving electroacoustical transducer into individual component signals which facilitate the identification and bearing determination thereof.

In the prior art standard radar and sonar systems, a pulse is transmitted which may be considered to be the product of a rectangular pulse and a carrier signal having some given frequency. This pulse is usually defined as a CW pulse and ordinarily contains a burst of ten or more cycles per second, depending on the length thereof. Such pulses are broadcast through the environmental medium pertinent to the system involved; that is, for example, in radar, they are propagated through the atmospheric-space type environmental medium, and in sonar they are transmitted through a fluid medium, such as sea water or the like.

The target reflections or echoes of these CW pulses arrive, for most practical purposes, independently at the receiving transducer at a time determined by the target distances involved and by the velocity of the particular energy propagation within the particular medium concerned. These echo signals are then usually amplified, rectified, and filtered, in order to remove the carrier frequency signal therefrom; thereby producing the envelopes thereof which, ideally, would again be an image or a series of images of the originally rectangular portion of the transmitted signal.

Range resolution, for the normal back-scattering configuration, is considered to be one-half of the original rectangular pulse length; and for target reflectors spaced this distance apart, a continuous echo is received. Greater distances between reflections yields a gap between the output envelopes and, thus, the actual distance between reflectors can be measured.

In many instances, there actually are many reflected signals which contributes overlapping echoes at the receiving transducers during each moment in time. These received signals are, of course, summed vectorially by the receiving transducer in such manner that the several components thereof add according to their respective phases, thereby yielding both constructive and destructive interference envelopes. As a general rule, a considerable variation in transducer output occurs for even slight differences in target reflector geometry. Therefore, in normal echo ranging systems, the transducer output signal is very complex. Accordingly, while the expected output signal from a known array of target reflectors can be determined, when the type of target is unknown, the individual echo reflections therefrom is not readily resolved into discernable and distinguishable components by using conventional extant systems. Hence, there is ostensively no highly effective way to ascertain the number and relative positions of a large number of reflectors located on an unknown target by the devices of the prior art, and this, of course, leaves a great deal to be desired, as far as target identification is concerned.

To a considerable extent, the subject invention overcomes the aforementioned disadvantages, inasmuch as the integrated output signal from the receiving transducer is resolved into individual components, each of which represent the echo from a target having more than one reflecting surface and/or from two or more targets likewise having one or more reflecting surfaces, respectively. Such component signals, when readout by an appropriate display system, vastly improve target identification probabilities. Accordingly, the invention is deemed an improvement over the prior art in that respect.

It is, therefore, an object of this invention to provide an improved method and means for resolving an integrated composite signal into its component signals.

Another object of this invention is to provide a signal processor which restores the component signals summed or integrated by a receiving transducer.

Another object of this invention is to provide an improved method and means for increasing the resolution of a target echo signal.

Still another object of this invention is to provide a method and means for processing a sonar signal or a radar signal in such manner that the contribution of each reflection from a target consists of only one positive spike and one negative spike separated in time by the duration of the transmitted CW pulse, with the middle portion of said pulse substantially removed.

A further object of this invention is to provide a data signal processor in which the resolution of multiple targets is independent of transmitted pulse length for pulses less than the length of the search range of the transmitting sonar to which it is attached.

A further object of this invention is to provide a method and means for resolving the echo signals from two or more targets which are separated by a distance equal to or greater than a quarter wavelength of the transmitted signal frequency.

Another object of this invention is to provide a signal processing system for substantially removing that portion of a pulse carrier wave located between the leading edge and following edge pips thereof.

A further object of this invention is to provide an improved method and means for processing data signals received by a transducer or a given transducer array so as to locate the source thereof with considerable precision.

Another object of this invention is to provide an improved method and means for identifying sonar and radar echo-searched targets.

Other objects and many of the attendant advantages will be readily appreciated as the subject invention becomes better understood by reference to the following detailed description when considered in conjunction with the accompanying drawings wherein:

FIG. 1 is a block diagram of one species which incorporates the broad concept of the signal processor constituting this invention;

FIG. 2 is a block diagram of a sonar system combined with another species of the signal processor constituting this invention;

FIG. 3 is an idealized graphical representation of the electrical signal waveforms occurring at the output of various elements of the invention when only a single target reflection is received thereby; and FIG. 4 is another idealized graphical representation of the electrical signal waveforms occurring at various elements of the invention when two target reflections are received thereby.

Referring now to FIG. 1, the species of the subject invention shown therein is disclosed as incorporating a receiving transducer 11 adapted for being responsive to that type of energy which is appropriate for the environmental medium in which it is operating, during any given operational circumstances. Thus, it may readily be seen, that in event the subject invention is used in combination with a radar system, transducer 11 would then be any suitable antenna capable of receiving electromagnetic energy from within its ambient atmospheric or spatial environment and converting it to an electrical signal proportional thereto which, of course, becomes the output thereof. On the other hand, in event the subject invention is combined with a sonar system, receiving transducer 11 would then be an electroacoustical transducer adapted for receiving an acoustical signal from within a subaqueous medium, such as sea water or the like, and converting it into a proportional electrical signal which, of course, constitutes the output thereof.

The output of transducer 11 is coupled to the input of a preamplifier 12, the output of which is connected to the inputs of a differentiator 13 and a delay line 14 having a delay of ¼ wavelength of the signal applied thereto. The output of differentiator 13 is coupled to the input of another amplifier 15, which may either be designed so as to have a fixed gain or an adjustable gain as desired in order to provide an optimum useful output level from differentiator 13.

As may readily be seen, the aforementioned differentiator 13, delay line 14, and amplifier 15 constitute, in this particular case, a referenced differentiator circuit 16. This term is employed in this particular instance because the output of differentiator 13 is effectively referenced against the output of delay line 14.

In this particular species of the invention, delay line 14 is preferably designed in such manner that it provides a predetermined amount of delay or phase shifting of the electrical signal processed thereby, as is apropriate for the particular frequency intended to be processed therein. In other words, if a particular fixed frequency signal is intended to be received by transducer 11 and effectively processed by referenced differentiator 13, delay line 14 may have a fixed delay period designed therein which will operate to effect the delay required to provide an optimum operation of the overall invention. However, it should be understood that delay line 14 may also be a variable delay line if so desired, in order to make it suitable for operation with received signals of different or varying frequencies. Obviously, designing delay line 14 in such manner as to function as described above would be well within the purview of one skilled in the art having the benefit of the teachings herewith presented.

These are two outputs from referenced differentiator circuit 16, one of which is supplied by the output of delay line 14 and the other of which is supplied by the output of amplifier 15. These outputs are respectively applied to the inputs of an adder circuit 17 and, in this particular instance through variable resistors 18 and 19, respectively, to a common junction 21. The common junction of said variable resistors 18 and 19 is connected through another resistor 22 to a ground 23.

An output terminal 24 is connected to the aforesaid common junction 21 and constitutes the output of adder 17 as well as the output of the entire subject invention. It may, of course, be connected to any suitable readout, display, or utilization device.

The species of the instant invention disclosed in FIG. 2 is exemplarially combined with a sonar system intended to echo-search for, identify, and determine the location of predetermined targets that are submerged within water or the like.

Incorporated in the overall system of FIG. 2 is an electroacoustical receiving transducer 31, the output of which is connected to the input of a sonar receiver 32. Sonar receiver 32 is conventionally connected to and synchronized with a sonar transmitter 33, which, in turn, has its output coupled to the input of a transmitting electroacoustical transducer 34. As may readily be seen, receiver 32 and transmitter 33 are combined in a conventional manner as to become a sonar system 35. But, it should be understood that sonar system 35 may, likewise, have Doppler determining circuits incorporated therein or associated therewith, as is conventional in the art.

One of the outputs of sonar system 35 is taken from the output of receiver 32 and is coupled through a preamplifier 36 to the inputs of a referenced differentiator circuit 37. In this particular case, the inputs of referenced differentiator circuit 37 actually are the inputs of a first differentiator 38 and an amplifier 39. The output of said first differentiator is connected to the input of a second differentiator 41, and the output of said second differentiator is connected to the input of a variable gain amplifier 42.

The gain control element of variable gain amplifier 42 is connected to a Doppler determining device or sensor 43 which, in turn, is appropriately connected to receiver 32 of sonar system 35, so that the gain of amplifier 42 will be varied as a function of the Doppler frequency which exists, in event there is relative movement between the search vehicle and the target, during any given operational circumstances. This situation will be discussed more fully subsequently in the explanation of the operation of the subject invention presented below.

The outputs of referenced differentiator 37 in this particular species, are taken from the outputs of amplifiers 39 and 42. They are respectively coupled to the inputs of an adder circuit 44 and specifically through a pair of variable resistors 45 and 46 to a common junction 47. Common junction 47 is then coupled through another resistor 48 to a ground 49. As may readily be seen, the aforesaid common junction 47 is connected to an output terminal 51, and this output terminal, of course, constitutes the output of the subject invention. It may also be connected to any suitable readout, display, or utilization device.

It may be shown theoretically, as well as by oscilloscope measurement and observation, that the signal processing effected by this invention of a CW echo pulse that has been reflected from a single target reflector will result in an output signal that has two distinct and ostensively unique waveform characteristics. One of such characteristics is the existence of a positive spike and a negative spike which are generated at approximately the beginning and the end of the received echo CW pulse, with the intermediate waveform therebetween essentially removed or having the appearance of a substantially steady state signal, the duration of which is about equal to the duration of said originally transmitted CW pulse. Another of such characteristics is the amplitudes of the processed output spikes are independent of one another and depend only on the target strength (that is, the effective reflecting area) of the individual reflector. Finally, the resolution of multiple targets is independent of transmitted pulse length for all pulses having lengths that are less than the length of the search range of the echo-ranging instrument. Thus, resolution of two or more targets which are separated by a distance equal to or greater than one-quarter wavelength of the frequency of the transmitted CW pulse can be obtained with this technique.

The first signal processing method accomplished by the device of FIG. 1 is theoretically possible because differentiators act as dynamic filters and advance the phase of a signal approximately 90° and delay lines may be designed to retard the phase of a signal about 90°, depending on the frequency thereof. The second signal processing method accomplished by the device of FIG. 2 is theoretically possible because, again, differentiators act as dynamic filters and advance the phase of a signal about 90° and, thus, a pair of them connected in series would effect approximately a 180° phase shift.

The respective functions involved may be represented mathematically by the following equations:

$$S(t) = \sum_{i=1}^{N} A_i M\left(t - \frac{2R_i}{c}\right) \cdot \sin\left[2\pi f_c \left(t - \frac{2R_i}{c}\right) - \phi_i\right] \quad (1)$$

where:

$A_i$ = the amplitude change caused by reflection at point $i$,
$S$ = the receiving transducer electrical output sum signal in volts,
$S(t) = S$ per unit time,
$t$ = time in seconds,
$N$ = the number of echoes received from separate and distinct reflectors,
$i$ = any number between 1 and $N$ which represents that reflector which is being evaluated,
$R_i$ = the range to point $i$,
$f_c$ = the frequency of the CW pulse in cycles per second,
$M$ = modulation on CW carrier,
$\phi_i$ = the phase change caused by reflection at the point $i$.

The first derivative ($D_1$) of this equation is effectively obtained by the device of FIG. 1. Thus, the signal processing which occurs therein may be defined mathematically by the equation:

$$D_1(S(t)) = 2\pi f_c \sum_{i=1}^{N} A_i \cdot D_1\left[M\left(t - \frac{2R_i}{c}\right)\right] \cdot \cos\left[2\pi f_c \left(t - \frac{2R_i}{c}\right) - \phi_i\right] \quad (2)$$

where each of the terms incorporated therein are the same as those used in Equation 1, respectively.

The second derivative ($D_2$) of Equation 1 is effectively obtained by the embodimnt of FIG. 2. Likewise, the signal processing which occurs therein may be defined mathematically by the equation:

$$D_2(S(t)) = -4\pi^2 f_c^2 \sum_{i=1}^{N} A_i D_2\left[M\left(t - \frac{2R_i}{c}\right)\right] \cdot \sin\left[2f_c\left(t - \frac{2R_i}{c}\right) - \phi_i\right] \quad (3)$$

where each of the terms incorporated therein are the same as those used in Equation 1, respectively.

From Equation 3, it may be seen that the voltage amplitude of the second derivative, $D_2(St)$, varies with the square of the frequency. In effect, this makes cancellation of the steady state portion of the received pulse signal uncertain at different frequencies, even though the second derivative acts as a variable delay line, as the signal bandwidth changes.

Although the second derivative processing component of the device of FIG. 2 will function adequately for some purposes without Doppler compensation, if the amount of relative movement between the echo-ranger and target is varied or exceeds some maximum amount, depending on the circumstances, the point of diminishing returns is soon reached, as far as effective cancellation of the steady state portion of the signal is concerned. Therefore, it is preferable that the level of the second derivative signal be compensated as a function of Doppler, in order to substantially optimize target resolution for most practical purposes.

Fundamentally, the second derivative method works about the same as the first derivative method (with second differentiator 41 acting as and substituting for delay line 14 in referenced differentiator circuit 37), and, consequently, both produce outputs which contain target echo signal resolutions having waveform characteristics similar to those typically and ideally depicted in FIG. 3(d) and FIG. 4(e).

The operation of the invention will now be discussed briefly in conjunction with all figures.

For most practical purposes, echo signals emanating from different targets or from different reflectors on the same target may be considered as being independent from one another while they are propagating through their environmental medium. This is also true as far as this invention and the two species thereof herewith disclosed are concerned. Hence, they will be treated as such in the following discussion.

If the preferred embodiment device of FIG. 1 and the inventive concept embodied therein is considered first, and if in order to facilitate the disclosure of the operation thereof it is considered that a sonar-type operation takes place in sea water or the like, it may be seen that any acoustical CW search signal of predetermined pulse length and frequency originally broadcast toward a submarine target, subsequently reflected therefrom, and received by electro-acoustical transducer 11 will be suitable for further processing therein. Due to the construction and inherent nature of electro-acoustical transducer 11, it will effectively integrate said received signal and, thus, yield a sum output signal having waveform characteristics substantially similar to that exemplarially illustrated in FIG. 3(a).

This integrated transducer output signal is then amplified to a more useful voltage level by amplifier 12 before being applied to differentiator 13 and delay line 14. The derivative of this signal is then taken by said differentiator 13, thereby resulting in a signal having an appearance substantially similar to the waveform shown in FIG. 3(b).

The output of delay line 14 is represented by the waveform of FIG. 3(c). It, of course, is similar to that shown in FIG. 3(a) except that the phase thereof is shifted a predetermined amount, depending on the amount of delay designed therein, relative to the output of differentiator 13. With this in mind, the phase difference therebetween will readily be recognized, if both of the idealized waveforms of FIG. 3(a) and FIG. 3(c) are inspected; and furthermore, in this particular invention, it should be considered that the output from delay line 14 is employed as the reference signal, against which the differentiator output is referenced, as far as referenced differentiator circuit 16 is concerned.

Amplifier 15 is incorporated in referenced differentiator circuit 16 in order to make the amplitudes of the outputs of differentiator 13 and delay line 14 substantially equal.

These output signals are approximately 180° out of phase with each other, due to the fact that the signal processing within differentiator 13 shifts the phase of one about 90° in the "advance" direction, and the signal processing within delay line 14 shifts the phase of the other approximately 90° in the "retard" direction, depending on the frequency of the received signal (received by transducer 11, that is). Hence, the relative phase relationships are such that the phase difference therebetween is about 180°.

When these two output signals are added vectorially by adder circuit 17, the resulting signal takes on the general appearance of the exemplary waveform depicted in FIG. 3(d). As may be seen therefrom, the leading edges thereof add up to a positive blip which occurs at substantially the same time as the occurrence of the leading edge of the received CW pulse, the following edges thereof add up to a negative blip which occurs at substantially the same time as the occurrence of the following edge of the received CW pulse, and the intermediate portions thereof add up in such manner as to substantially cancel out. The latter effect is, of course, of paramount importance in this invention, because it is the effect which enables high target reflector resolution to be obtained from a target having two or more reflecting surfaces or from two or more targets having any number of reflecting surfaces.

Resistors 18 and 19 are preferably variable resistors which may be manually adjusted in order to facilitate equalizing the amplitudes of the two output signals from referenced differentiator 16. The proper amplitude equalization thereof, in turn, optimizes the vectorial addition effected in adder 17, and thereby causes the proper intermediate pulse signal cancellation to occur.

It can readily be discerned by inspection of FIG. 4, wherein there is shown typical idealized waveforms which are produced by the subject invention as a result of receiving echo signals from a pair of reflecting surfaces or perhaps a pair of targets, as the case may be, that high resolution can be obtained from a pair of reflecting targets.

The signal waveforms of FIGS. 4(a) and (b) ideally represent first and second echo signals, respectively. FIG. 4(c) then ideally represents the sum signal obtained from the transducer. The derivative of the sum signal is ideally represented by FIG. 4(d). And the processed output, showing the entrance and exit points of the two echoes, is typically represented by the waveform of FIG. 4(e). Again, from FIG. 4(e), it can be seen that high target resolution is obtained from a target having two or more reflecting surfaces or from two or more targets having any number of reflecting surfaces, since the pair of blips occurring near the beginning of the waveform and the pair of blips occurring near the end of the waveforms clearly show the presence of a pair of received reflector echoes, with the intermediate portions of the waveform substantially canceled out for the same reasons as presented above in connection with the discussion of FIG. 3.

As a matter of fact, actual experimentation in an ideal test environment has indicated that use of the first derivative signal, as it is used in the embodiment of FIG. 1, may improve target resolution by a factor of at least ten.

Although the species of FIG. 2 is constructed somewhat differently than that of FIG. 1, its overall function is substantially similar thereto. Of course, in FIG. 2 the signal processor is attached to a sonar set in such manner that a new structural combination is effected which, in turn, improves the overall operation of the entire sonar-signal processor system over that which would be obtained from the sonar alone, especially from the echo signal resolution standpoint.

In this particular species, transmitter 33 and transducer 34 causes the sonic echo-search signal to be broadcast toward a submarine target, and the reflection or reflections therefrom are received by receiving transducer 31 and sonar receiver 32. After amplification to a more useful level by preamplifier 36, the first and second differential thereof is taken by differentiators 38 and 41. Again, amplification thereof is effected by variable gain amplifier 42. The gain of amplifier 42 is preferably adjusted in accordance with the Doppler frequency sensed by Doppler sensor 43 and sonar 35, although it may also be manually adjusted if so desired. The output of preamplifier 36 is also again amplified by variable amplifier 39, the output of which acts as the reference signal, as far as the two outputs of referenced differentiator circuit 37 is concerned. As is probably obvious by now, the amplitudes of the two output signals from referenced differentiator circuit 37 should be essentially equal, in order that the steady state, middle portion of the received echo signal will be removed effectively by algebraic addition in adder 44.

The Doppler compensation feature is preferably incorporated within the invention because the amplitude of the output signal from second differentiator 41 is adversely affected, if there happens to be any relative movement between the echo-ranger and the target. But, since the amplitude thereof, in such instance, is a direct function of Doppler, it is susceptible to being adjusted to compensate therefor by Doppler sensor 43.

Amplifier 39 is preferably made so the gain thereof is adjustable, so as to put it within the operable output range of controlled amplifier 42.

Once the amplitudes of the outputs of amplifiers 39 and 42 are substantially equalized, they are applied to adder 44, where they are vectorially added together. This addition, of course, substantially removes the intermediate portions of the received echo signal, inasmuch as the signals at the outputs of amplifiers 39 and 42 are approximately 180° out of phase, while those portions representing targets or reflectors are discontinuities and do not terminal destructively. Consequently, the output from terminal 51 would graphically appear somewhat like the waveform shown in either FIG. 3(c) or FIG. 4(e), depending on the number of reflectors involved. Accordingly, it may readily be seen that considerable improvement of target resolution is obtained as a result of the aforegoing signal processing.

Again, it should be understood that, although the preferred embodiments of the subject invention are used as or associated with underwater echo-ranging systems, they may also be used as or associated with radar systems or any other apparatus requiring such signal processing, in order to resolve certain type signals.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A signal processor for resolving a composite signal into its component parts, comprising in combination:

transducer means for receiving a plurality of signals having various phase relationships and for producing a composite output signal therefrom;

a referenced differentiator means connected to the output of said transducer means for converting said composite signal into a pair of signals having a predetermined relative phase relationship, said referenced differentiator means including an input terminal effectively connected to the output of said transducer means, a pair of output terminals, a first differentiator connected to said input terminal, a second differentiator connected to the output of said first differentiator, a first adjustable gain amplifier coupled between the output of said second differentiator and one of said pair of output terminals, and a second adjustable gain amplifier connected between the aforesaid input terminal and the other of said output terminals; and means connected to the output terminals of said referenced differentiator means for producing an output signal which is the addition of said pair of relative phase-related signals.

2. The device of claim 1 wherein said means connected to the outputs of said referenced differentiator means for producing an output signal which is the addition of said pair of relatively phase related signals comprises an adder circuit including:

a first variable resistor having a pair of terminals, with one of the terminals thereof connected to one of the outputs of said referenced differentiator means for response to one of said pair of signals having a predetermined relative phase relationship;

a second variable resistor having a pair of terminals, with one of the terminals thereof connected to the other of the outputs of said referenced differentiator means for response to the other of said pair of signals having a predetermined relative phase relationship, and with the other terminal thereof connected to the other terminal of the aforesaid first variable resistor;

a ground;

a third resistor having a pair of terminals with one thereof connected to the aforesaid other terminals of said first and second variable resistors, thereby forming a common junction thereat, and with the other terminal thereof connected to said ground.

3. Means for resolving target echo signals received and integrated by a receiving transducer into component signals representing said target echo signals comprising in combination:

a receiving transducer adapted for receiving target echo signals;

a reference differentiator circuit including a differentiator having an input and an output with the input thereof effectively connected to the output of said receiving transducer, an adjustable gain amplifier having an input and an output with the input thereof coupled to the output of said differentiator, and a variable delay line having an input and an output with the input thereof coupled to the input of said differentiator and effectively connected to the output of said receiving transducer;

a first variable resistor having a pair of terminals, one of which is connected to the output of said adjustable gain amplifier;

a second variable resistor having a pair of terminals, one of which is connected to the output of said variable delay line;

a ground;

a third resistor having a pair of terminals, with one of the terminals thereof connected to the other terminals of said first and second variable resistors in such manner as to form a common junction thereat, and with the other terminal thereof connected to said ground; and an output terminal connected to said common junction of the aforesaid first, second, and third variable resistors.

4. Means for resolving target echo signals received and integrated by a receiving transducer into component signals representing said target echo signals comprising in combination:

a receiving transducer for receiving target echo signals;

a referenced differentiator circuit including a first differentiator having an input and an output with the input thereof effectively connected to the output of said receiving transducer, a second differentiator having an input and an output with the input thereof coupled to the output of said first differentiator, a first adjustable gain amplifier having an input, an output, and a gain control element with the input thereof coupled to the output of said second differentiator, and a second adjustable gain amplifier having an input, an output, and a gain control element with the input thereof coupled to the input of said first differentiator and effectively coupled to the output of said receiving transducer;

a first variable resistor having a pair of terminals, one of which is connected to the output of said first adjustable gain amplifier;

a second variable resistor having a pair of terminals, one of which is connected to the output of said second adjustable gain amplifier;

a ground;

a third resistor having a pair of terminals, with one terminal thereof connected to the other terminals of said first and second resistors in such manner as to form a common junction thereat, and with the other terminal thereof connected to said ground; and an output terminal connected to the common junction of the aforesaid first, second, and third resistors.

5. The invention according to claim 4 further characterized by:

a sonar system having an interconnected transmitter and receiver, with the receiver thereof effectively coupled between said receiving transducer and said reference differentiator circuit;

a transmitting transducer connected to the output of said sonar transmitter adapted for broadcasting CW pulse signals toward a target, the reflections of which are received by the aforesaid receiving transducer; and means connected between said sonar receiver and the gain control element of said first adjustable gain amplifier for controlling the gain thereof in response to any Doppler that exists as a result of relative movement between said target and said sonar system.

References Cited

UNITED STATES PATENTS

| 2,700,156 | 1/1955 | Sunstein | 343—17.1 X |
| 3,109,154 | 10/1963 | Grada et al. | 340—3 |
| 3,268,892 | 8/1966 | Atlas | 343—17.1 X |

RICHARD A. FARLEY, *Primary Examiner.*